US006769522B2

United States Patent
Kawamoto et al.

(10) Patent No.: US 6,769,522 B2
(45) Date of Patent: Aug. 3, 2004

(54) FLUID-TYPE TORQUE TRANSMISSION DEVICE WITH LOCKUP CLUTCH

(75) Inventors: Takeshi Kawamoto, Yao (JP); Shinji Fujimoto, Hirakata (JP); Hideki Tanishiki, Hirakata (JP); Hajime Yoshida, Neyagawa (JP); Kenji Mieda, Hirakata (JP)

(73) Assignee: Exedy Corporation, Osaka (JP)

( * ) Notice: Subject to any disclaimer, the term of this patent is extended or adjusted under 35 U.S.C. 154(b) by 0 days.

(21) Appl. No.: 10/291,600

(22) Filed: Nov. 12, 2002

(65) Prior Publication Data

US 2003/0121743 A1 Jul. 3, 2003

(30) Foreign Application Priority Data

Dec. 28, 2001 (JP) ........................................ 2001-401213
Dec. 28, 2001 (JP) ........................................ 2001-401214

(51) Int. Cl.[7] ........................... F16H 41/24; B21D 22/18
(52) U.S. Cl. ........................... 192/3.29; 29/889.5; 72/85
(58) Field of Search ............................... 192/3.29, 3.28; 29/889.5, 557; 72/82, 83, 84, 85, 86, 87, 377, 348, 379.2, 414; 148/120

(56) References Cited

U.S. PATENT DOCUMENTS

| 4,833,295 | A | * | 5/1989 | Locker et al. | ......... | 219/121.63 |
| 4,919,241 | A | * | 4/1990 | Koshimo | .................... | 192/3.29 |
| 5,515,955 | A | * | 5/1996 | Victoria et al. | ............ | 192/3.28 |
| 5,718,311 | A | * | 2/1998 | Victoria et al. | ............ | 192/3.28 |
| 5,996,391 | A | * | 12/1999 | Mizobuchi | .................... | 72/348 |
| 6,053,292 | A | * | 4/2000 | Macdonald | ................ | 192/3.28 |
| 6,390,263 | B1 | * | 5/2002 | Arhab | ........................ | 192/3.29 |
| 6,530,253 | B1 | * | 3/2003 | Gotou et al. | .................... | 72/85 |

FOREIGN PATENT DOCUMENTS

| JP | 2000-130550 A | 5/2000 |
| JP | 2000-240755 A | 9/2000 |
| JP | 2001-87838 A | 4/2001 |

* cited by examiner

*Primary Examiner*—Rodney H. Bonck
(74) *Attorney, Agent, or Firm*—Shinjyu Global IP Counselors. LLP (57) ABSTRACT

A strong lightweight front cover 11 that prevents distortion of a sliding contact surface when the front cover and impeller shell are welded together is provided. The front cover 11 has a radial flange part 44 and an axial flange part 42 that extends from an outside edge of radial flange part 44. The radial flange part 44 has a sliding contact surface 44a on an axially facing surface thereof for sliding against a friction facing 76. The axial flange part 42 has a connection part 51 that connects to the radial flange part 44 and a welding part that is connected by welding to a pump impeller. The various portions of the front cover 11 have differing rigidities and thicknesses.

25 Claims, 5 Drawing Sheets

FLUID-TYPE TORQUE TRANSMISSION DEVICE WITH LOCKUP CLUTCH

BACKGROUND OF THE INVENTION

1. Field of the Invention

The present invention relates to a fluid-type torque transmission device having a lockup clutch e.g., a torque converter or a fluid coupling. More specifically, the present invention relates to a fluid-type torque transmission device having a sliding contact surface formed on its front cover for sliding against the lockup clutch.

2. Background Information

In general, a torque converter is designed to facilitate smooth acceleration and deceleration because it transfers power using a fluid. However, slippage of the fluid causes energy loss to occur and fuel economy to be poor.

Therefore, conventional torque converters are equipped with a lockup device that mechanically couples a front cover on an input side to a turbine on an output side. The lockup device is disposed in a space between the front cover and the turbine. The lockup device chiefly has a circular disk-shaped piston, a driven plate, and a torsion spring. The circular disk-shaped piston can couple to the front cover. The driven plate is mounted to the rear surface of the turbine. Further, a torsion spring elastically couples the piston and the driven plate together in a rotational direction. An annular facing part is fixed to the piston in a position opposite a flat sliding contact surface of the front cover.

In the conventional lockup device just described, the operation of the piston is controlled by the change in hydraulic pressure within a main body of the torque converter. More specifically, when the lockup engagement is released, operating oil is delivered from the external hydraulic circuit to the space between the piston and the front cover. This operating oil flows radially outward through the space between the front cover and the piston and enters the main body of the torque converter from a radially outward location. When the lockup device is engaged, the operating oil between the front cover and the piston is drained from a radially inward location and the hydraulic pressure difference causes the piston to move toward the front cover. As a result the facing part provided on the piston is pressed against the sliding contact surface of the front cover. Thus, the torque of the front cover is transmitted to the turbine via the lockup device.

A conventional front cover is a disk-shaped member made of sheet metal formed by press molding. The front cover chiefly has a radial flange part, an axial flange part, and an inside cylindrical portion. The radial flange part has a sliding contact surface corresponding to the facing part of the lockup clutch. The axial flange part extends axially from the outer circumferential edge of the radial flange part and is fixed by welding to the pump impeller. The inside cylindrical portion is located radially inward of the radial flange part. A center boss is welded to the inner circumferential edge of the front cover, i.e., the inner circumferential edge of the inside circumferential portion.

The front cover requires a certain degree of strength in order to withstand the hydraulic pressure inside the torque converter and the internal pressure caused by rotation. In order to secure the required strength, it is necessary conventionally to use raw material that has a large thickness. A front cover made with such material is heavy and expensive. Thus, it has been difficult to reduce the weight of the front cover while also maintaining sufficient strength in conventional front covers.

The shells of the front cover and impeller are fixed together by welding. More specifically, a cylindrical axial flange part that extends in the axial direction is formed on the outer circumferential edge of the front cover and the outer circumferential edge of the impeller shell is welded to the tip of the flange part. The welding is accomplished using a plurality of torches that weld the two members in the circumferential direction at a plurality of locations.

Since the welding is conducted over a certain amount of time, uneven stresses in the welding bead portion cause welding distortion to occur in the front cover and the sliding contact surface provided on the radial flange part becomes wavy in the circumferential direction. Consequently, when the lockup device frictionally engages, the desired friction characteristic cannot be obtained and wheel vibration occurs.

In view of the above, there exists a need for a fluid-type torque transmission device with a lockup device that overcomes the above mentioned problems in the prior art. This invention addresses this need in the prior art as well as other needs, which will become apparent to those skilled in the art from this disclosure.

SUMMARY OF THE INVENTION

An object of the present invention is to reduce the weight of the front cover while also maintaining sufficient strength.

Another object of the present invention is to make it difficult for distortion of the front cover sliding contact surface to occur when the front cover and impeller shell are welded together.

A fluid-type torque transmission device with a lockup clutch in accordance with a first aspect of the present invention has a front cover, a turbine, a pump impeller, and a lockup clutch. The front cover is fixed to an input shaft. The turbine is connected to an output shaft. The pump impellers are connected by welding to the front cover. The lockup clutch has a facing part for sliding against the front cover. The front cover has a radial flange part that extends in the radial direction and an axial flange part that extends in the axial direction from the outside edge of the radial flange part. Preferably, the flange parts are formed integrally as a single unit. The radial flange part has a sliding contact surface for sliding against the facing part on an axially facing surface of the radial flange part. The axial flange part has a connection part at one end where it connects to the radial flange part and a welding part at the other end where it is connected by welding to the pump impeller. The axial flange part is formed such that the region containing the welding part has a lower rigidity than the region containing the connection part.

Since the region containing the welding part has a lower rigidity than the region containing the connection part with this fluid-type torque transmission device, the region containing the welding part distorts relatively easily and the region containing the connection part does not distort easily when the welding part of the front cover is welded to the pump impeller. As a result, it is difficult for welding distortion to occur at the sliding contact surface of the front cover.

A fluid-type torque transmission device with a lockup clutch in accordance with a second aspect of the present invention is the device of the first aspect, wherein the rigidity of the region containing the welding part is made smaller than the rigidity of the region containing the connection part by making the wall thickness of the region containing the welding part thinner than the wall thickness of the region containing the connection part.

This fluid-type torque transmission device employs a simple method to make it more difficult for welding distortion to occur at the sliding contact surface of the front cover.

A fluid-type torque transmission device with a lockup clutch in accordance with a third aspect of the present invention is the device of second aspect, wherein the region containing the welding part occupies at least 30% of the entirety of the axial flange part.

This fluid-type torque transmission device makes it even more difficult for welding distortion to occur at the sliding contact surface of the front cover.

A fluid-type torque transmission device with a lockup clutch in accordance with a fourth aspect of the present invention is the device of the second aspect, wherein the axial length of the region containing the welding part is longer than the axial length of the region containing the connection part.

This fluid-type torque transmission device makes it even more difficult for welding distortion to occur at the sliding contact surface of the front cover.

A fluid-type torque transmission device with a lockup clutch in accordance with a fifth aspect of the present invention is the device of the second aspect, wherein the region containing the welding part occupies at least 80% of the entirety of the axial flange part.

This fluid-type torque transmission device makes it even more difficult for welding distortion to occur at the sliding contact surface of the front cover.

A fluid-type torque transmission device with a lockup clutch in accordance with a sixth aspect of the present invention is the device of the second aspect, wherein the region containing the welding part occupies most of the entirety of the axial flange part except for the connection part.

This fluid-type torque transmission device makes it even more difficult for welding distortion to occur at the sliding contact surface of the front cover.

A fluid-type torque transmission device with a lockup clutch in accordance with a seventh aspect of the present invention is the device of any one of the second to sixth aspects, wherein the wall thickness of the region containing the welding part is 20 to 90% of the wall thickness of the region containing the connection part.

This fluid-type torque transmission device makes it even more difficult for welding distortion to occur at the sliding contact surface of the front cover.

A fluid-type torque transmission device with a lockup clutch in accordance with an eighth aspect of the present invention is the device of the seventh aspect, wherein the wall thickness of the region containing the welding part is 30 to 80% of the wall thickness of the region containing the connection part.

This fluid-type torque transmission device makes it even more difficult for welding distortion to occur at the sliding contact surface of the front cover.

A ninth aspect of the present invention is a method of manufacturing the front cover of a fluid-type torque transmission device with a lockup clutch. The device is provided with a front cover, a turbine, a pump impeller, and a lockup clutch. The front cover is fixed to an input shaft. The turbine is connected to an output shaft. The pump impeller is connected by welding to the front cover. The lockup clutch has a facing part for sliding against the front cover. The manufacturing method has the following steps:

a step for forming a sliding contact surface for sliding against the facing part on an axially facing surface of the radially extending radial flange part of the front cover;

a step for forming a welding part for welding to the pump impeller on the axial flange part, which is connected to the outside edge of the radial flange part at the connection part and extends in the axial direction; and a step for making the rigidity of the region containing the welding part lower than the rigidity of the region containing the connection part.

With this method of manufacturing the resulting front cover of a fluid-type torque transmission device has a region containing the welding part that is made to have a smaller rigidity than the region containing the connection part. Consequently, when the welding parts of the front cover are welded to the pump impeller, the region containing the welding parts distorts easily and the region containing the connection part does not distort easily. As a result, it is difficult for welding distortion to occur at the sliding contact surface of the front cover.

A tenth aspect of the present invention is a method of manufacturing the front cover of a fluid-type torque transmission device with a lockup clutch in accordance with the ninth aspect, wherein the method also has a step for making the wall thickness of the region containing the welding part thinner than the wall thickness of the region containing the connection part.

The resulting fluid-type torque transmission device employs a simple method to make it more difficult for welding distortion to occur at the sliding contact surface of the front cover.

An eleventh aspect of the present invention is a method of manufacturing the front cover of a fluid-type torque transmission device with a lockup clutch in accordance with the tenth aspect, wherein the step for making the wall thickness thinner involves transferring a portion of the wall thickness of the region containing the welding part to the region containing the connection part.

The resulting fluid-type torque transmission device employs a simple method to make it more difficult for welding distortion to occur at the sliding contact surface of the front cover.

A fluid-type torque transmission device in accordance with a twelfth aspect of the present invention has a front cover, a turbine, and a pump impeller. The front cover is fixed to an input shaft. The turbine is connected to an output shaft. The pump impeller is connected to the front cover. The front cover has a radial flange part that extends in the radial direction and an axial flange part that extends in the axial direction from an outside edge of the radial flange part. The wall thickness of the radial flange part is 105 to 200% of the thickness of the sheet material from which the front cover is made. Further, the wall thickness of an inside circumferential portion of the front cover is 50 to 95% of the thickness of the sheet material from which the front cover is made.

In this fluid-type torque transmission device, the wall thickness of the radial flange part is larger than the thickness of the sheet material and the wall thickness of the inside circumferential portion of the front cover is smaller than the thickness of the sheet material. Therefore, the pressure that the radial flange part can withstand, the withstand pressure, is increased while the overall weight is reduced. Although the radial flange part requires a certain withstand pressure, the inside circumferential portion can perform sufficiently with a smaller withstand pressure. Consequently, no problems regarding withstand pressure occur as a result of reducing the wall thickness of the inside circumferential portion. In short, this front cover simultaneously achieves both sufficient withstand pressure and reduced weight.

Since the wall thickness of the radial flange part is made larger than the thickness of the sheet material, a relatively thin sheet material is used. Consequently the weight of the front cover can be reduced even further.

A fluid-type torque transmission device in accordance with a thirteenth aspect is the device of the twelfth aspect, wherein the wall thickness of the radial flange part is 150 to 200% of the sheet material from which the front cover is made, and the wall thickness of the inside circumferential portion of the front cover is 50 to 75% of the thickness of the sheet material from which the front cover is made.

A fluid-type torque transmission device in accordance with a fourteenth aspect of the present invention is the device of twelfth or thirteenth aspect with a lockup clutch, wherein the wall thickness of the inside circumferential portion of the front cover is 50 to 90% of the wall thickness of the radial flange part.

This fluid-type torque transmission device achieves an even better balance between the withstand pressure and weight reduction.

A fluid-type torque transmission device with a lockup clutch in accordance with a fifteenth aspect is the device of the fourteenth aspect, wherein the wall thickness of the inside circumferential portion of the front cover is 70 to 90% of the wall thickness of the radial flange part.

This fluid-type torque transmission device achieves the best balance between the withstand pressure and weight reduction.

A fluid-type torque transmission device with a lockup clutch in accordance with a sixteenth aspect of the present invention is the device of any one of the twelfth to fifteenth aspects, wherein the axial flange part has a connection part at one end where it connects to the radial flange part and a welding part at the other end where it is connected by welding to the pump impeller. Further, the axial flange part is formed such that the wall thickness of the region containing the welding part is thinner than the wall thickness of the region containing the connection part.

In this fluid-type torque transmission device, the wall thickness of the base portion of the axial flange part is larger than the wall thickness of the tip portion of the axial flange part. As a result, the withstand pressure of the base portion is increased while the overall weight is reduced. Although the base portion of the axial flange part requires a certain withstand pressure, the tip portion can perform sufficiently with a smaller withstand pressure. Consequently, no problems regarding withstand pressure occur as a result of reducing the wall thickness of the tip portion. In short, this front cover achieves both sufficient withstand pressure and reduced weight simultaneously.

A seventeenth aspect of the present invention is a method of manufacturing the front cover of a fluid-type torque transmission device provided with a front cover fixed to an input shaft, a turbine connected to an output shaft, and a pump impeller connected to the front cover. The method has the following step:

A step in which the wall thickness of the radial flange part is increased by transferring a portion of the wall thickness at a radially inner portion of the front cover to a radially outer portion of the front cover.

In this front cover manufacturing method, the wall thickness of the radial flange part is made larger than the wall thickness of the inside circumferential portion of the front cover. Therefore, the withstand pressure of the radial flange part is increased while the overall weight is reduced. Although the radial flange part requires a certain withstand pressure, the inside circumferential portion can perform sufficiently with a smaller withstand pressure. Consequently, no problems regarding withstand pressure occur as a result of reducing the wall thickness of the inside circumferential portion. In short, this front cover achieves both sufficient withstand pressure and reduced weight simultaneously.

Furthermore, raw material having a small thickness can be used because the wall thickness of the radial flange part is increased by transferring a portion of the wall thickness at a radially inner portion of said front cover to a radially outer portion of said front cover. This allows the manufacturing cost to be reduced.

An eighteenth aspect of the present invention is a method of manufacturing the front cover of a fluid-type torque transmission device in accordance with the seventeenth aspect having a step in which the wall thickness of the base portion of the axial flange part is increased by transferring a portion of the wall thickness of the tip portion of the axial flange part to the base portion. The axial flange part extends in the axial direction from the outside edge of the radial flange part.

In this front cover manufacturing method, the wall thickness of the base portion of the axial flange part is made larger than the wall thickness of the tip portion of the axial flange part. As a result, the withstand pressure of the base portion is increased while the overall weight is reduced. Although the base portion of the axial flange part requires a certain withstand pressure, the tip portion can perform sufficiently with a smaller withstand pressure. Consequently, no problems regarding withstand pressure occur as a result of reducing the wall thickness of the tip portion. In short, this front cover achieves both sufficient withstand pressure and reduced weight simultaneously.

Furthermore, raw material having a small thickness can be used because the wall thickness of the base portion of the axial flange part, which extends in the axial direction from the outside edge of the radial flange part, is increased by transferring a portion of the wall thickness of the tip portion to the base portion. This allows the manufacturing cost to be reduced.

A nineteenth aspect of the present invention is a method of manufacturing the front cover of a fluid-type torque transmission device in accordance with the seventeenth or eighteenth aspect also having a step in which a cylindrical boss that protrudes toward the engine in the axial direction is formed integrally at the center of the inside circumferential portion.

With this front cover manufacturing method, the boss of the front cover is also formed integrally, thus simplifying the manufacture of the front cover.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following description of the embodiments of the present invention is provided for illustration only, and not for the purpose of limiting the invention as defined by the appended claims and their equivalents.

(1) Basic Structure of Torque Converter

Figure 1:
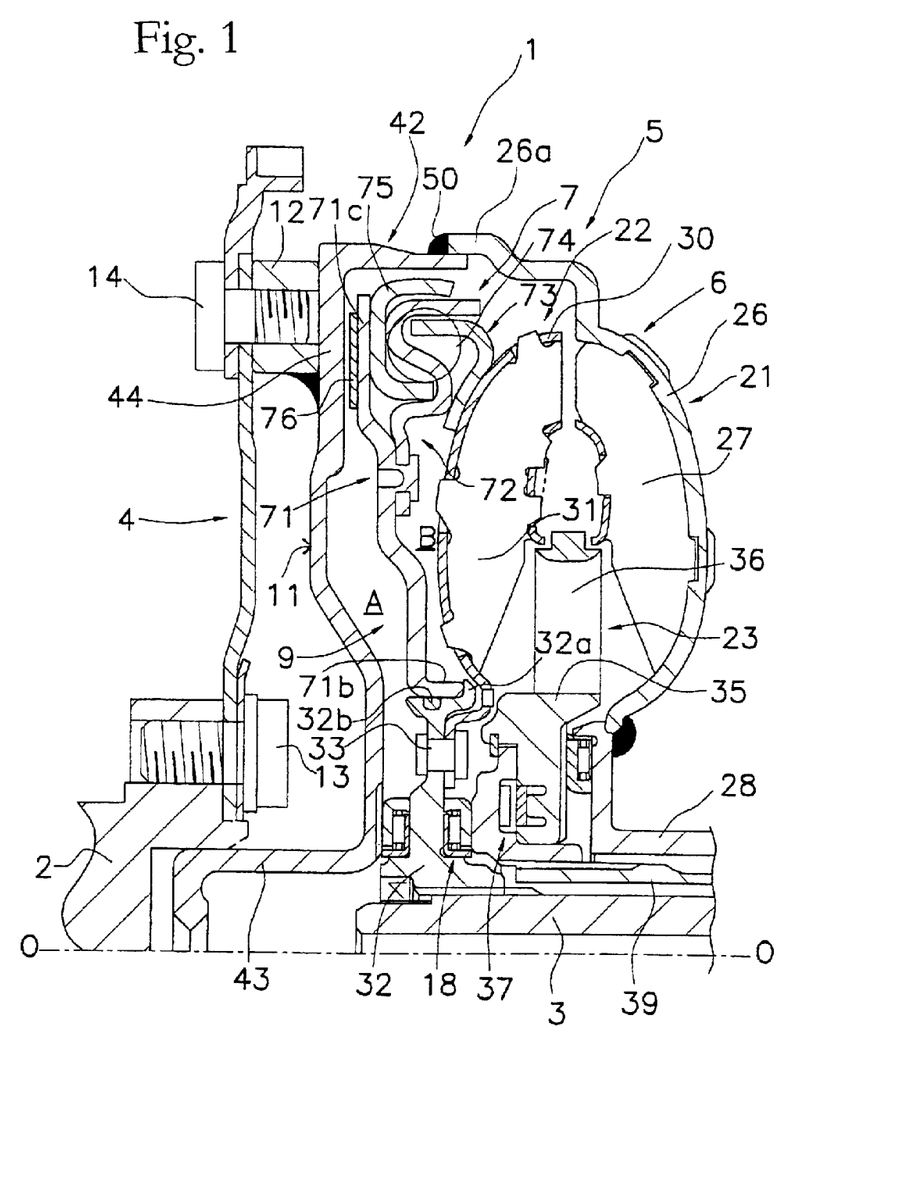
FIG. 1 is a vertical cross-sectional schematic view of a torque converter in accordance with a preferred embodiment of the present invention.

FIG. 1 is a vertical cross-sectional schematic view of a torque converter 1 in accordance with a preferred embodiment of the present invention. The torque converter 1 serves to transmit torque from an engine crankshaft 2 (input shaft) to a transmission input shaft 3 (output shaft). The engine (not shown) is disposed to the left of FIG. 1 and the transmission (not shown) is disposed to the right of FIG. 1. Line O—O in FIG. 1 indicates the rotational axis of the torque converter 1.

The torque converter 1 chiefly has a flexible plate 4 and a torque converter main body 5. The flexible plate 4 is a thin disk-shaped member that serves to transmit torque and absorb bending or axial vibrations transmitted to the torque converter 5 from the crankshaft 2. Therefore, the flexible plate 4 has sufficient rigidity in the rotational direction to transmit torque but has low rigidity in the bending or axial direction.

The torque converter main body 5 has a torus-shaped part made up of three types of bladed wheels, an impeller 21, a turbine 22, and a stator 23, and a lockup device 7.

Figure 2:
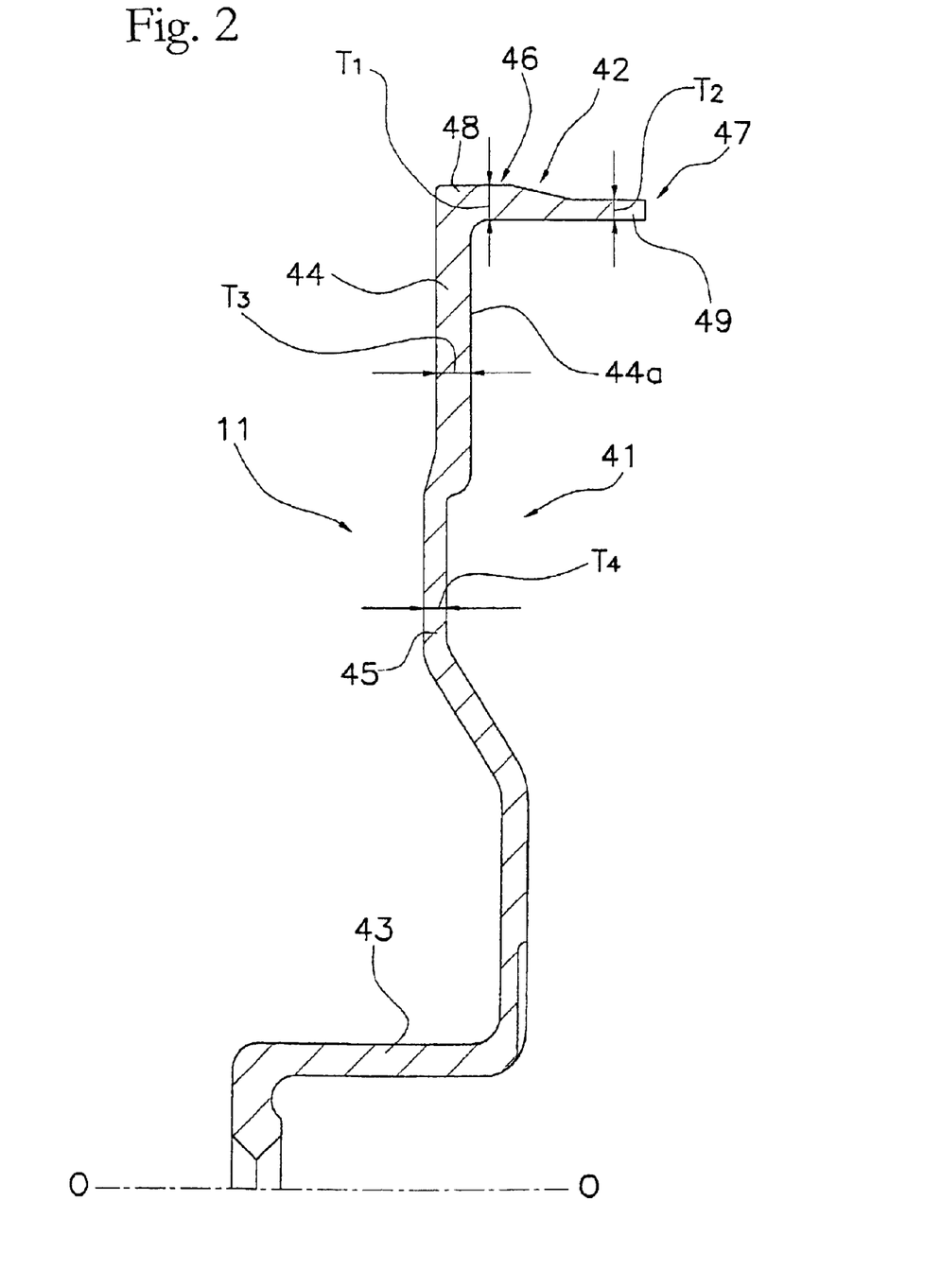
FIG. 2 is a cross-sectional view of a front cover of the torque converter.

The front cover 11 is a disk-shaped member all portions of which are formed integrally. The front cover 11 is disposed in close proximity to the flexible plate 4. As shown in FIG. 2, the front cover 11 is disk-shaped member made of sheet metal. The front cover 11 has a disk-shaped part 41, an axial flange part 42, and a cylindrical boss 43. The axial flange 42 is cylindrical and extends axially toward the transmission from an outer circumferential edge of the disk-shaped part 41. The cylindrical center boss 43 extends axially toward the engine from an inner circumferential edge of the disk-shaped part 41. An inside circumferential portion 45 is disk-shaped and, together with the radial flange part 44, forms the axially facing engine-side surface of a fluid chamber. Referring to FIG. 1, the center boss 43 is an axially-extending cylindrical member that is formed integrally with the inside circumferential portion 45 and inserted into a center hole of the crankshaft 2.

As seen in FIG. 1, an inner circumferential part of the flexible plate 4 is fixed to the tip end of the crankshaft 2 with a plurality of bolts 13. A plurality of nuts 12 are fixed with uniform circumferential spacing to an outer circumferential portion of the front cover 11 on the side thereof that faces the engine. The flexible plate 4 is fixed to the outer circumferential portion of the front cover 11 by installing bolts 14 into the nuts 12. Thus, uniform circumferential spacing between the flexible plate 4 and the front cover 11 is maintained.

Referring to FIG. 2, the disk-shaped part 41 of the front cover 11 has the radial flange part 44 radially outside and the inside circumferential portion 45 radially inside. In other words, the radial flange part 44 is located radially outside of the disk shaped part 41. Further the inside circumferential portion 45 is located radially inside the disk-shaped part 41. The radial flange part 44 is a portion that is both annular and disk-shaped and has a prescribed length in the radial direction. An annular, flat sliding contact surface 44a is formed on the inside, i.e., the side facing the transmission in the axial direction, of the radial flange part 44. The axial flange part 42 is a cylindrical portion that extends in the axial direction toward the transmission from the outer circumferential edge of the radial flange part 44. As seen in FIG. 1, the impeller shell 26 of the impeller 21 is fixed by welding to the tip end of the axial flange part 42. Thus, the front cover 11 and the impeller 21 form a fluid chamber filled with operating oil.

The impeller 21 (pump impeller) chiefly has an impeller shell 26, a plurality of impeller blades 27, and an impeller hub 28. The plurality of impeller blades 27 is fixed to the inside of the impeller shell 26. The impeller hub 28 is fixed to an inner circumferential part of impeller shell 26.

The turbine 22 is arranged inside the fluid chamber in such a manner that it faces the impeller 21 in the axial direction. The turbine 22 chiefly has a turbine shell 30, a plurality of turbine blades 31 and a turbine hub 32. The plurality of turbine blades 31 is fixed to a surface of the turbine shell that faces the impeller 21. Further, the turbine hub 32 is fixed to an inner circumferential edge of the turbine shell 30. The turbine shell 30 and the turbine hub 32 are fixed together by a plurality of rivets 33. Splines for engaging with the input shaft 3 are formed on an internal surface of the turbine hub 32. As a result of these splines, the turbine hub 32 rotates integrally with the input shaft 3.

The stator 23 is a mechanism that serves to adjust the flow direction of the operating oil returning to the impeller 21 from the turbine 22. The stator 23 is a member fabricated by casting resin, an aluminum alloy, or the like as a single unit. The stator 23 is disposed between the inner circumferential part of the impeller 21 and the inner circumferential part of the turbine 22. The stator 23 chiefly has an annular stator shell 35 and a plurality of stator blades 36 provided on an external surface of the stator shell 35. The stator shell 35 is supported by a cylindrical stationary shaft 39 via a one-way clutch 37. The stationary shaft 39 extends between the external surface of the input shaft 3 and the internal surface of the impeller hub 28.

The aforementioned bladed wheels 21, 22, 23 and shells 26, 30, 35 form a torus-shaped fluid operating chamber 6 within the fluid chamber. Also, within the fluid chamber, an annular space 9 is secured between the front cover 11 and the fluid operating chamber 6.

(2) Structure of Lockup Device

The lockup device 7 (lockup clutch) is disposed in the space 9 between the turbine 22 and the front cover 11. The lockup device 7 serves to couple mechanically the turbine 22 and front cover 11 together when necessary. The lockup device 7 is disposed in the space existing axially between the front cover 11 and the turbine 22. The lockup device 7 is overall disk-shaped and roughly divides the space 9 in two. Here, the space between the front cover 11 and the lockup device 7 is called a first hydraulic chamber A and the space between lockup device 7 and turbine 22 is called a second hydraulic chamber B.

The lockup device 7 functions both as a clutch and as an elastic coupling mechanism. The lockup device 7 chiefly has a piston 71, a drive plate 72, a driven plate 73, a plurality of torsion springs 74, and a spring holder 75. The piston 71 constitutes a clutch. The drive plate 72 is fixed to the piston 71 and constitutes a damper input member. The driven plate 73 is fixed to the turbine 22 and constitutes a damper output member. The plurality of torsion springs 74 elastically couple the plates 72 and 73 together in the rotational direction. The spring holder 75 connects the plurality of springs 74 in series in the rotational direction and supports the springs 74 in the radial direction.

The piston 71 is a member that performs clutch engagement and release. Further, the piston 71 also serves as the input member for the elastic coupling mechanism function of the lockup device 7. The piston 71 is shaped like a circular disk with a center hole formed therein. The piston 71 extends through the entire radial dimension of the space 9 so as to divide roughly the space 9 into two parts. An inside cylindrical part 71b that extends toward the transmission in the axial direction is formed on the inner circumferential edge of the piston 71. The inside cylindrical part 71b is supported by the external surface of the turbine hub 32 in such a manner that it can move in the rotational and axial directions. However, a flange 32a that abuts against the inside cylindrical part 71b is formed on the external surface of the turbine hub 32 in order to limit the movement of the piston 71 toward the transmission in the axial direction. Also, an annular seal ring or O-ring 32b that touches against the internal surface of the inside cylindrical part 71b is provided on the external surface of the turbine hub 32, thus providing a seal against fluid movement in the axial direction at the inner circumferential edge of the piston 71. Meanwhile, a frictional coupling part 71c is formed on the outer circumferential portion of the piston 71. The frictional coupling part 71c is an annular portion having a prescribed length in the radial direction, and both axially facing sides thereof are planar in shape and form surfaces that extend perpendicularly to the axial direction. An annular friction facing 76 (facing part) is attached to the side of the frictional coupling part 71c that faces the engine in the axial direction. The friction facing 76 faces the sliding contact surface 44a of the front cover 11 and together the friction facing 76 and the sliding contact surface 44a constitute the clutch of the lockup device 7.

(3) Structure of Front Cover

1. Thickness Relationships Regarding Axial Flange Part

As shown in FIG. 2, the axial flange part 42 is made up of an engine-side portion 46 and a transmission-side portion 47. The wall thickness, i.e., length in the radial direction, of the transmission-side portion 47 is smaller than that of the engine-side portion 46 and, thus, the rigidity of the transmission-side portion 47 is lower.

Figure 3:
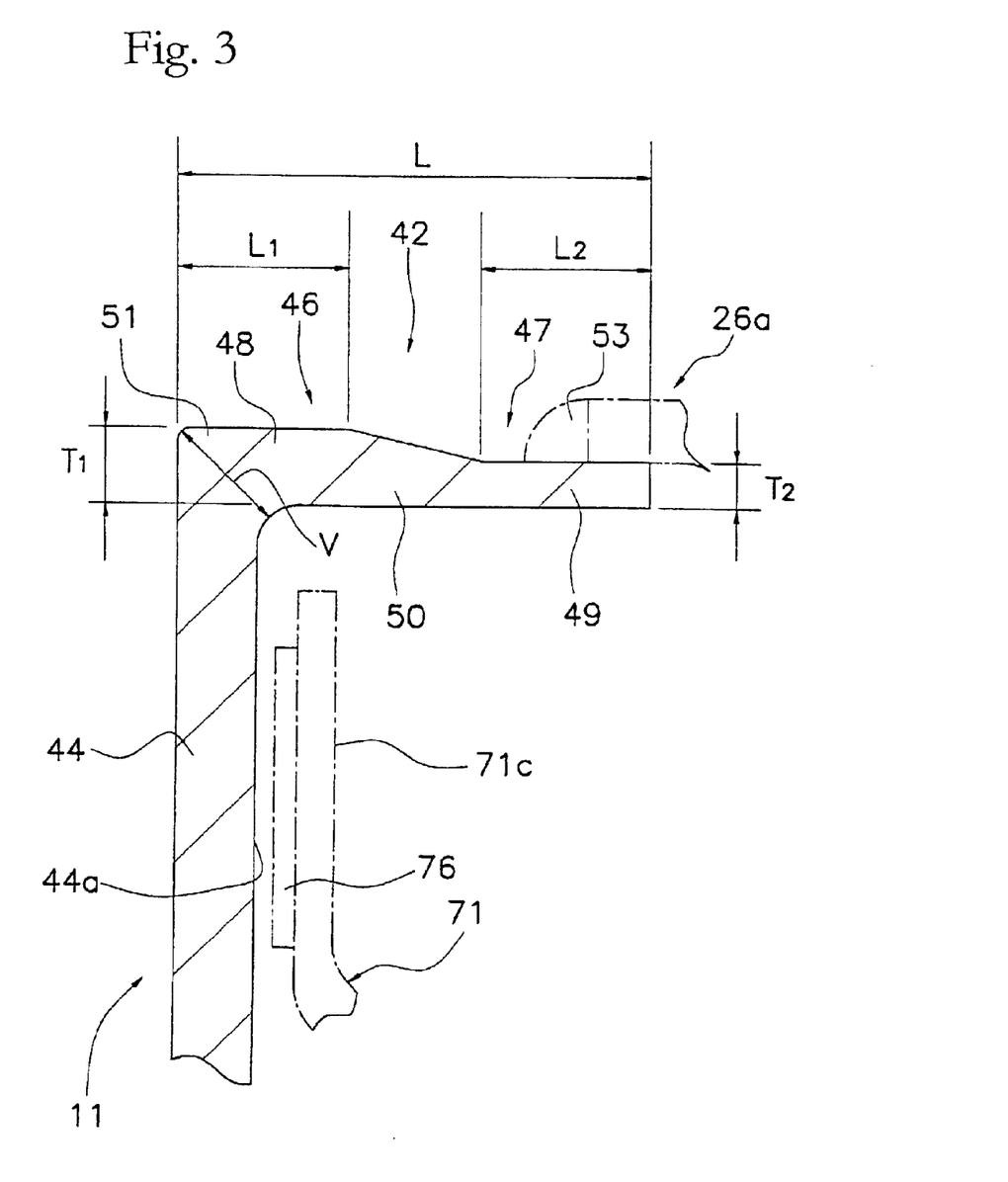
FIG. 3 is a partial enlarged view of FIG. 2.

Referring to FIG. 3, the engine-side portion 46 has a first end part 48 that is connected to the radial flange part 44. The first end part 48 has the same degree of wall thickness as the radial flange part 44 and is formed integrally with the radial flange part 44 through a connection part 51. The connection part 51 constitutes an outside corner part of the front cover 11. In short, the first end part 48 is a region of uniform thickness that includes the connection part 51.

The transmission-side portion 47 has a second end part 49. The outside portion of the second end part 49 touches against the outer circumferential edge 26a of the impeller shell 26 and is welded thereto by a weld 53. In short, the second end part 49 is a region of uniform thickness that includes the welding part. Moreover, the uniform wall thickness of the second end part 49 is smaller than the wall thickness of the first end part 48.

The transmission-side portion 47 also has an intermediate part 50. The intermediate part 50 links the first end part 48 and the second end part 49 together. The thickness of the intermediate part 50 gradually decreases as it approaches the second end part 49 from the first end part 48.

The internal surface of the axial flange part 42 is straight in the axial direction such that the internal diameter thereof is uniform. Consequently, the external diameter of the axial flange part 42 is larger at the first end part 48 than at the second end part 49.

In the following discussion, the wall thickness (radial dimension) of the first end part 48 is designated as T1 and the wall thickness (radial dimension) of the second end part 49 is designated as T2. Also, the axial length of the first end part 48 is designated as L1, the axial length of the second end part 49 is designated as L2, and the axial length of the axial flange part 42 is designated as L. The engine-side point of origin of both L and L2 is the edge, i.e., corner tip, of the connection part 51, which corresponds to the lateral surface of the radial flange part 44 that faces the engine in the axial direction.

Since T2 is smaller than T1, the rigidity of the second end part 49 is smaller than the rigidity of the first end part 48. Therefore, when the outer circumferential edge 26a of the impeller shell 26 is welded to the second end part 49, distortion caused by welding heat occurs chiefly in the second end part 49 and the intermediate part 50. Consequently, it is difficult for distortion to occur in the first end part 48 and the radial flange part 44. Thus, the flatness of the sliding contact surface 44a of the front cover 11 can be maintained. As a result, during lockup it is difficult for the frictional performance of the frictional coupling to decline and vehicle vibrations are not likely to occur.

In this particular embodiment, the wall thickness V (length from outside corner to inside corner) of the connection part 51, i.e., corner part, is larger than wall thickness T1 of the first end part 48. Consequently, it is even more difficult for the first end part 48 and the radial flange part 44 to be distorted by welding heat.

It is preferred that the wall thickness T2 of the second end part 49 be 20 to 90% of the wall thickness T1 of the first end part 48. If it is less than 20% problems will occur due to decreased strength of the axial flange part, and if it is greater than 90% the effect of reducing the wall thickness will be insufficient. It is even better for thickness T2 of the second end part 49 to be 30 to 80% of the thickness T1 of the first end part 48.

It is preferred that the axial length L2 of second end part 49 be 30 to 90% of the axial length L of the axial flange part 42. If it is less than 30% the effect of reducing the wall thickness will be insufficient and if it is greater than 90% problems will occur due to decreased strength of the axial flange part. Thus, it is preferred that the axial length L2 of the second end part 49 be 80 to 90% of the axial length L of the axial flange part 42. In particular, it is preferred that the axial length L2 of the second end part 49 be greater than 50% of the axial length L of the axial flange part 42 and/or that the axial length L2 of the second end part 49 be longer than the axial length L1 of the first end part 48.

It is preferred that the wall thickness T1 of the first end part 48 be 5 to 20% of the axial length L of the axial flange part 42. Assuming the wall thickness T1 of the first end part 48 is roughly the same as the wall thickness of the radial flange part 44, the rigidity of the axial flange part 42 will be too low if the wall thickness is less than 5% of the length. Further, the rigidity of the axial flange part 42 will be too high if the wall thickness is greater than 20% of the length. It is more difficult for welding heat to cause distortion of the sliding contact surface 44a when the thickness is 10% of the length than when the thickness is 15% of the length—even if the axial length L2 of the second end part 49 is smaller than the axial length L1 of the first end part 48. When the thickness is 10% of the length and the axial length L2 of the second end part 49 is larger than the axial length L1 of the first end part 48, it is even more difficult for welding heat to cause distortion of the sliding contact surface 44a.

2. Thickness Relationships Regarding Entire Front Cover

As seen in FIG. 2, in the following explanation, the wall thickness (axial dimension) of the radial flange part 44 is designated as T3 and the wall thickness (axial dimension) of the inside circumferential portion 45 is designated as T4. The wall thickness T3 of the radial flange part 44 is larger than the wall thickness T4 of the inside circumferential portion 45. As previously explained, the wall thickness T1 of the base portion of the axial flange part 42 is larger than the wall thickness T2 of the tip portion. Thus, there are no problems regarding withstand pressure because the wall thickness is large at the radial flange part 44 and the base portion of the axial flange part 42, where it is particularly necessary for the withstand pressure of the torque converter to be high. Meanwhile, since the wall thicknesses of the inside circumferential portion 45 and the second end part 49 of the axial flange part 42 are both small, the overall weight is considerably reduced. In short, this embodiment provides the front cover 11 with both good withstand pressure and reduced weight.

The wall thickness of the radial flange part 44 is 105 to 200% of the thickness of the sheet material and the wall thickness of the inside circumferential portion 45 of the front cover 11 is 50 to 95% of the thickness of the sheet material. Thus, a relatively thin material is used and the weight of the front cover 11 can be reduced even further. It is more preferable for the wall thickness of the radial flange part to be 150 to 200% of the thickness of the sheet material and the wall thickness of the inside circumferential portion 45 of the front cover 11 to be 50 to 75% of the thickness of the sheet material.

A good balance between the withstand pressure and weight reduction of the front cover 11 is achieved when the wall thickness T4 of the inside circumferential portion 45 of the front cover 11 is 50 to 90% of the wall thickness T3 of the radial flange part 44. The balance is even better when the same relationship is 70 to 90%.

(4) Method of Manufacturing Front Cover

The method of manufacturing the front cover 11 is explained. The front cover 11 is formed by rotational forming using a disk-shaped blank (piece of material).

1. Flat Shape Molding Step

Figure 4:
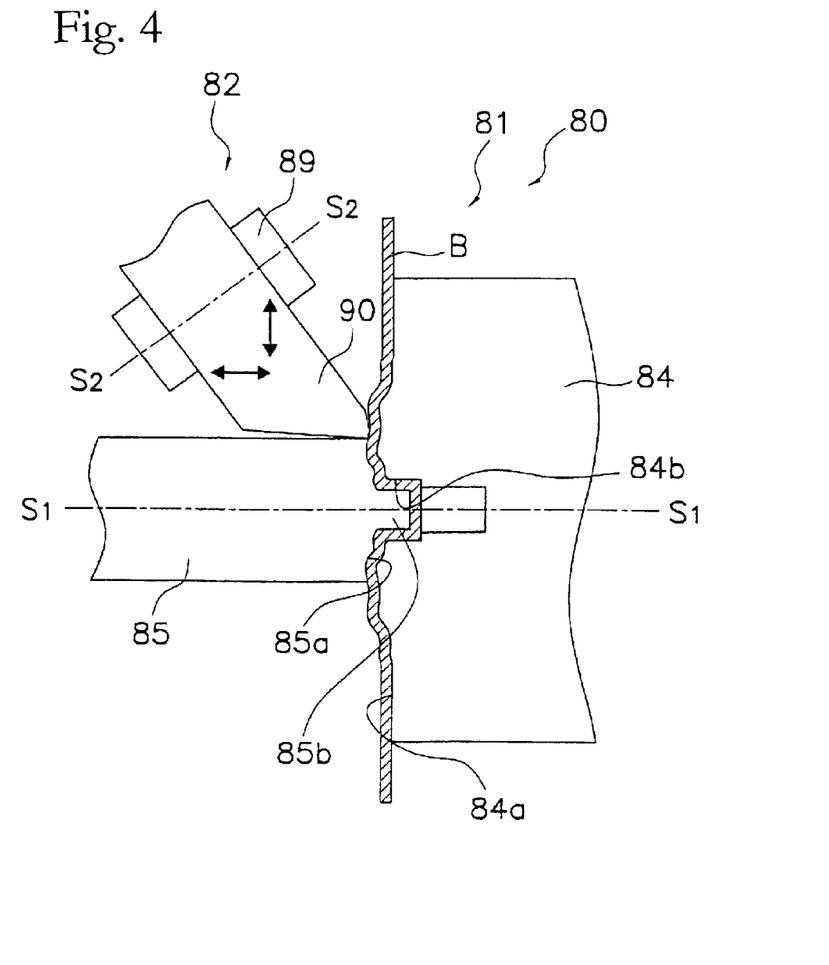
FIG. 4 is a schematic view illustrating a step for molding the surface shape of the front cover.

A rotational flow forming machine 80 that performs the rotational forming is explained with reference to FIG. 4. The rotational fluid forming machine 80 has a holding mechanism 81 and a first rotating tool 82. The holding mechanism 81 has a mandrel 84 and a first holding jig 85 and can rotate about a center axis S1—S1. The mandrel 84 is a solid-cylindrical member with a relatively large diameter. The mandrel 84 has a recessed part 84b at the center of an end face 84a thereof. The first holding jig 85 is a solid-cylindrical member with a small diameter and has a protruding part 85b at the center of an end face 85a thereof. The first holding jig 85 faces the mandrel 84 in the axial direction and the protruding part 85b can be inserted into the recessed part 84b.

The first rotating tool 82 has a first rotating tool holding part 89 and a first roller 90 held therein. The first rotating tool holding part 89 can move in the axial and radial directions. The first roller 90 serves to mold a blank B by pressing the blank B against the end face 84a of the mandrel 84 and moving the material. The first roller 90 can rotate with respect to the first rotating tool holding part 89 about the center axis S2—S2. The center axis S2—S2 is slanted with respect to the center axis S1—S1.

The blank B is a disk-shaped metal member formed by die punching and already has a center boss 43 before the molding process begins. In the state shown in FIG. 4, the blank B is held between the mandrel 84 and the first holding jig 85. More specifically, the center boss 43 is disposed inside the recessed part 84b of the mandrel 84 and the protruding part 85b of the first holding jig 85 is disposed inside the center boss 43. Consequently, not only the center boss 43 portion but also the inner circumferential portion of the blank B to the outside of the center boss 43 is sandwiched between the end face 84a of the mandrel 84 and the end face 85a of the first holding jig 85.

With the center portion of the blank B thus secured, the mandrel 84 and the first holding jig 85 rotate about the center axis S1—S1. Then, the first rotating tool 82 approaches the blank B and moves in the radial direction such that the first roller 90 the rotates about rotational axis S2—S2. The first roller 90 presses the blank B against the end face 84a of the mandrel 84 and forms the disk-shaped portion of the front cover 11. During this operation, the first rotating tool 82 moves a portion of the wall thickness of the inside circumferential portion of the disk-shaped portion of the blank B toward the center. As a result, the wall thickness of the inside circumferential portion 45 of the front cover 11 becomes smaller than the wall thickness of the radial flange part 44.

2. External Shape Molding Step

Figure 5:
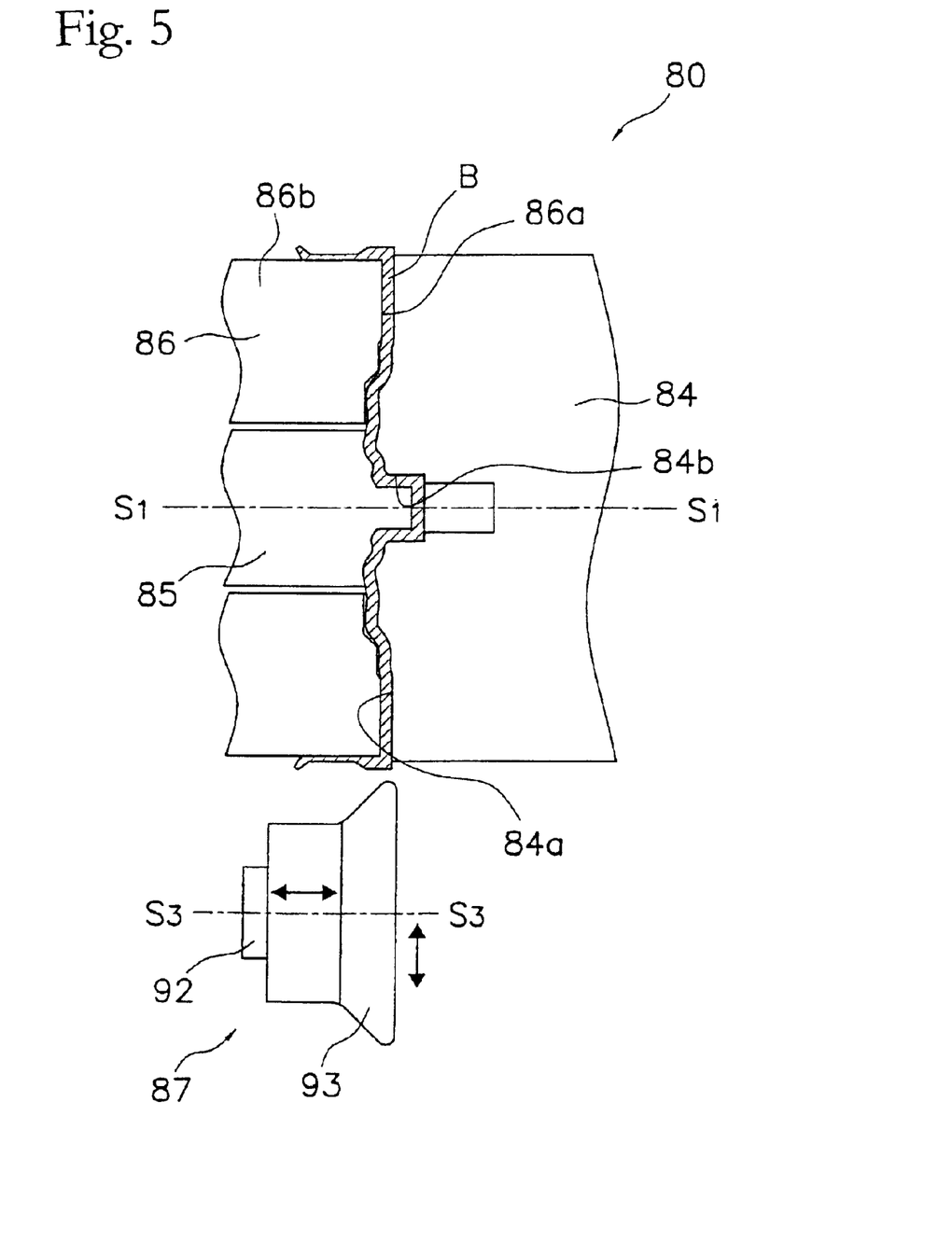
FIG. 5 is a schematic view illustrating a step for molding the external shape of the front cover.

Next, as shown in FIG. 5, a second holding jig 86 is prepared. The second holding jig 86 is a cylindrical member having a center hole. The second holding jig 86 is positioned around the first holding jig 85 and has an end face 86a. The outer circumferential surfaces of the blank B are sandwiched between the end face 86a and the end face 84a of the mandrel 84.

The second rotating tool 87 has a second rotating tool holding part 92 and a second roller 93 held therein. The second rotating tool holding part 92 can move in the axial and radial directions. The second roller 93 is a structure that serves to mold the blank B by pressing it against the external surface 86b of the second holding jig 86 and moving the material. The second roller 93 can rotate with respect to the second rotating tool holding part 92 about the center axis S3—S3. The center axis S3—S3 is parallel to the center axis S1—S1.

With the center portion and outer circumferential portion of the blank B thus secured, the mandrel 84, the first holding jig 85, and the second holding jig 86 rotate about the center axis S1—S1. Then the second rotating tool 87 approaches the blank B and moves in the axial direction such that the second roller 93 rotates about the rotational axis S3—S3. The second roller 93 presses the outer circumferential portion of the blank B against the external surface 86b of the second holding jig 86 and forms the axial flange part 42 of the front cover 11.

During this operation, the second rotating tool 87 moves a portion of the wall thickness of the tip portion of the axial flange part 42 toward the base portion. As a result, the front cover 11 is formed such that the wall thickness of the first end part 48 and the connection part 51 of the axial flange part 42 is larger than the wall thickness of the second end part 49. It should be apparent that the rotational flow forming machine including the jigs 85 and 86, the mandrel 84, and the first and second rotating tools 82 and 87, can be configured to make the front cover 11 with any of the aforementioned dimensions and features.

(5) Other Embodiments

The present invention is not limited to torque converters; it can also be applied to fluid couplings. Also, the type and structure of the lockup device is not limited to that of the previously described embodiment.

Effects of the Invention

With a fluid-type torque transmission device in accordance with the present invention, the region containing the welding part has a lower rigidity than the region containing the connection part. Consequently, the region containing the welding part distorts easily and the region containing the connection part does not distort easily when the welding part of the front cover is welded to the pump impeller. As a result, it is difficult for welding distortion to occur at the sliding contact surface of the front cover.

Further, a fluid-type torque transmission device in accordance with the present invention, the wall thickness of the radial flange part is larger than the thickness of the sheet material and the wall thickness of the inside circumferential portion of the front cover is smaller than the thickness of the sheet material. Therefore, the withstand pressure of the radial flange part is increased while the overall weight is reduced. Furthermore, since a relatively thin sheet material is used, the weight of the front cover can be reduced even further.

As used herein, the following directional terms "forward, rearward, above, downward, vertical, horizontal, below, and transverse" as well as any other similar directional terms refer to those directions of a device equipped with the present invention. Accordingly, these terms, as utilized to describe the present invention should be interpreted relative to a device equipped with the present invention.

The terms of degree such as "substantially," "about," and "approximately" as used herein mean a reasonable amount of deviation of the modified term such that the end result is not significantly changed. These terms should be construed as including a deviation of at least ±5% of the modified term if this deviation would not negate the meaning of the word it modifies.

This application claims priority to Japanese Patent Application Nos. 2001-401213 and 2001-401214. The entire disclosures of Japanese Patent Application No. 2001-401213 and 2001-401214 are hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A fluid-type torque transmission device comprising:
    a front cover being fixed to an input shaft, said front cover having,
        a radial flange part extending in a radial direction, said radial flange part having a sliding contact surface on an axially facing surface thereof, and
        an axial flange part extending in an axial direction from a radially outside edge of said radial flange part, said radial and axial flange parts being formed integrally as a unitary member, said axial flange part having a connection part at a first axial end connecting to said radial flange part and a welding part at a second axial end, said axial flange part being formed such that a first region containing said welding part has a lower rigidity than a second region containing said connection part, an axial length of said first region containing said welding part being longer than an axial length of said second region containing said connection part;
    a turbine being connected to an output shaft;
    a pump impeller being connected by welding to said front cover at said welding part of said axial flange part; and
    a lockup clutch having a facing part being configured to slide against said radial flange part of said front cover.

2. The fluid-type torque transmission device with lockup clutch according to claim 1, wherein
    said first region containing said welding part has a first wall thickness that is thinner than a second wall thickness of said second region containing said connection part.

3. The fluid-type torque transmission device according to claim 2, wherein
    said first region containing said welding part occupies at least 30% of the entirety of said axial flange part.

4. The fluid-type torque transmission device according to claim 3, wherein
    said first wall thickness of said first region containing said welding part is 20 to 90% of said second wall thickness of said second region containing said connection part.

5. The fluid-type torque transmission device according to claim 4, wherein
    said first wall thickness of said first region containing said welding part is 30 to 80% of said second wall thickness of said second region containing said connection part.

6. The fluid-type torque transmission device according to claim 2, wherein
    said first region containing said welding part occupies at least 80% of the entirety of said axial flange part.

7. The fluid-type torque transmission device according to claim 6, wherein
    said first wall thickness of said first region containing said welding part is 20 to 90% of said second wall thickness of said second region containing said connection part.

8. The fluid-type torque transmission device according to claim 7, wherein
    said first wall thickness of said first region containing said welding part is 30 to 80% of said second wall thickness of said second region containing said connection part.

9. The fluid-type torque transmission device according to claim 2, wherein
    said first region containing said welding part occupies the entirety of said axial flange part except for said connection part.

10. A method of manufacturing a front cover comprising:
    forming a sliding contact surface on an axially facing surface of a radially-extending radial flange part of said front cover;
    forming a welding part connected to a radially outside edge of said radial flange part at a connection part and extending in an axial direction;
    making a first rigidity of a first region containing said welding part lower than a second rigidity of a second region containing said connection part;

making an axial length of said first region containing said welding part longer than an axial length of said second region containing said connection part;

configuring said front cover to be fixed to an input shaft; and making a fluid-type torque transmission device by assembling said front cover with, a turbine being configured to be connected to an output shaft, a pump impeller connected by welding to said welding part of said front cover, and a lockup clutch having a facing part for sliding against said sliding contact surface of said front cover.

11. The method of manufacturing a front cover according to claim 10, further comprising, making a first wall thickness of a first region containing said welding part thinner than a second wall thickness of a second region containing said connection part.

12. The method of manufacturing a front cover according to claim 11, wherein said step for thinning said first wall thickness involves transferring a portion of said first region containing said welding part to said second region containing said connection part.

13. A fluid-type torque transmission device comprising:

a front cover being fixed to an input shaft, said front cover having, a radial flange part extending in a radial direction, a first axial wall thickness of said radial flange part being 105 to 200% of a thickness of a sheet material from which said front cover is made, and an axial flange part extending in an axial direction from a radially outside edge of said radial flange part, a second axial wall thickness of an inside circumferential portion of said front cover being 50 to 95% of said thickness of said sheet material from which said front cover is made;

a turbine being connected to an output shaft; and a pump impeller connected to said front cover.

14. The fluid-type torque transmission device according to 13, wherein said first axial wall thickness of said radial flange part is 150 to 200% of said thickness of said sheet material from which said front cover is made, and said second wall thickness of the inside circumferential portion of said front cover is 50 to 75% of said thickness of said sheet material from which said front cover is made.

15. The fluid-type torque transmission device according to claim 14, wherein said second axial wall thickness of said inside circumferential portion of said front cover is 50 to 90% of said first axial wall thickness of said radial flange part.

16. The fluid-type torque transmission device according to claim 15, wherein said second wall thickness of said inside circumferential portion of said front cover is 70 to 90% of said first wall thickness of said radial flange part.

17. The fluid-type torque transmission device according to claim 16, wherein said axial flange part has a connection part at a first axial end that connects to said radial flange part and a welding part at a second axial end that connects by welding to said pump impeller, and said axial flange part is formed such that a first radial wall thickness of a first region containing said welding part is thinner than a second radial wall thickness of a second region containing said connection part.

18. The fluid-type torque transmission device according to claim 13, wherein said second axial wall thickness of said inside circumferential portion of said front cover is 50 to 90% of said first axial wall thickness of said radial flange part.

19. The fluid-type torque transmission device according to claim 18, wherein said second wall thickness of said inside circumferential portion of said front cover is 70 to 90% of said first wall thickness of said radial flange part.

20. A method of manufacturing a front cover comprising:

transferring a portion of a second axial wall thickness at a radially inner portion of said front cover to a first axial wall thickness of a radial flange part of a radially outer portion of said front cover to increase said first axial wall thickness; and configuring said front cover to form a fluid-type torque transmission device provided having, a front cover being configured to be fixed to an input shaft, a turbine being configured to be connected to an output shaft, and a pump impeller being configured to be connected to said front cover.

21. The method of manufacturing a front cover according to claim 20, further comprising, transferring a portion of a first radial wall thickness of a tip portion of an axial flange part of said front cover to a base portion of said axial flange part to increase a second radial thickness of said base portion.

22. The method of manufacturing a front cover according to claim 21, further comprising, forming a cylindrical boss that protrudes toward an engine side in an axial direction, said boss being formed integrally at the center of an inside circumferential portion of said front cover.

23. The method of manufacturing a front cover according to claim 20, further comprising, forming a cylindrical boss that protrudes toward an engine side in an axial direction, said boss being formed integrally at the center of an inside circumferential portion of said front cover.

24. The method of manufacturing a front cover according to claim 20, wherein said second wall thickness is 50% to 90% of said first wall thickness.

25. The method of manufacturing a front cover according to claim 24, wherein said second wall thickness is 70% to 90% of said first wall thickness.

* * * * *